United States Patent
Wen et al.

(10) Patent No.: US 11,386,583 B2
(45) Date of Patent: Jul. 12, 2022

(54) IMAGE CODING APPARATUS, PROBABILITY MODEL GENERATING APPARATUS AND IMAGE DECODING APPARATUS

(71) Applicant: FUJITSU LIMITED, Kawasaki (JP)

(72) Inventors: Sihan Wen, Beijing (CN); Jing Zhou, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 16/875,038

(22) Filed: May 15, 2020

(65) Prior Publication Data

US 2020/0372686 A1   Nov. 26, 2020

(30) Foreign Application Priority Data

May 22, 2019 (CN) .......................... 201910429870.3

(51) Int. Cl.
*G06T 9/00* (2006.01)
*G06F 17/15* (2006.01)

(52) U.S. Cl.
CPC .............. *G06T 9/002* (2013.01); *G06F 17/15* (2013.01)

(58) Field of Classification Search
CPC ......... G06T 9/002; G06F 17/15; H04N 19/13; H04N 19/136; H04N 19/172; H04N 19/91; H04N 19/42; H04N 19/44; G06N 3/0445; G06N 3/0454; G06N 3/08

See application file for complete search history.

(56) References Cited

U.S. PATENT DOCUMENTS

| | | | | |
|---|---|---|---|---|
| 2013/0315295 | A1* | 11/2013 | Terada | H04N 19/20 375/240.01 |
| 2018/0129893 | A1* | 5/2018 | Son | G06N 3/063 |
| 2019/0147318 | A1* | 5/2019 | Howard | G06N 3/08 706/27 |
| 2019/0172223 | A1* | 6/2019 | Vajda | G06V 40/103 |
| 2019/0172224 | A1* | 6/2019 | Vajda | G06N 3/084 |
| 2019/0172466 | A1* | 6/2019 | Lee | G06F 40/216 |
| 2019/0294413 | A1* | 9/2019 | Vantrease | G06F 7/5095 |
| 2019/0303715 | A1* | 10/2019 | Jiang | G06V 10/454 |
| 2020/0043468 | A1* | 2/2020 | Willett | G06N 5/003 |

(Continued)

OTHER PUBLICATIONS

Christian Szegedy, "Going Deeper with Convolutions", Jun. 2015, Proceedings of the IEEE Conference on Computer Vision and Pattern Recognition (CVPR), 2015, pp. 1-7.*

(Continued)

*Primary Examiner* — Omar S Ismail
(74) *Attorney, Agent, or Firm* — Staas & Halsey LLP (57) ABSTRACT

Embodiments of this disclosure provide an image coding apparatus, a probability model generating apparatus and an image decoding apparatus. A processor is to perform feature extraction on an input image to obtain first feature maps of N channels; to perform feature extraction on the input image with a size of the input image being adjusted K times, to respectively obtain second feature maps of N channels; and to concatenate the first feature maps of the K×N channels with the second feature maps of K×N channels to output a concatenated feature maps of channels. Hence, features of images may be accurately extracted and more competitive latent representations may be obtained.

8 Claims, 7 Drawing Sheets

(56) References Cited

U.S. PATENT DOCUMENTS

2020/0218948 A1* 7/2020 Mao ............... G06K 9/6232
2020/0234135 A1* 7/2020 Kim ............... G06V 10/454

OTHER PUBLICATIONS

Min Cheng, "Multi-Scale LSTM Model for BGP Anomaly Classification," Apr. 10, 2018, IEEE Transactions on Services Computing, vol. 14, No. 3, May/Jun. 2021, pp. 765-773.*

Chunfeng Lian, "Multi-channel multi-scale fully convolutional network for 3D perivascular spaces segmentation in 7T MR images", Feb. 27, 2018, Medical Image Analysis, vol. 46, May 2018, pp. 107-115.*

Haoyue Peng, "Residual Module and Multi-scale Feature Attention Module for Exudate Segmentation," Oct. 28-31, 2018, 2018 International Conference on Sensor Networks and Signal Processing (SNSP), pp. 111-115.*

Christian Szegedy et al., "Going Deeper with Convolutions", Proceedings of the IEEE Conference on Computer Vision and Pattern Recognition, 2015, pp. 1-9.

* cited by examiner

IMAGE CODING APPARATUS, PROBABILITY MODEL GENERATING APPARATUS AND IMAGE DECODING APPARATUS

CROSS-REFERENCE TO RELATED APPLICATION

This application claims priority under 35 USC 119 to Chinese patent application no. 201910429870.3, filed on May 22, 2019, in the China National Intellectual Property Administration, the entire contents of which are incorporated herein by reference.

FIELD

This disclosure relates to the technical fields of image compression and deep learning.

BACKGROUND

In recent years, deep learning has dominated the field of computer vision. No matter in image recognition or super-resolution reproduction, deep learning has become an important technique for picture research; however, its capabilities are not limited to these tasks. At present, deep learning technique has entered the field of image compression, gradually shows great potentials, and becomes a field of hot research.

Currently, image compression based on a deep neural network aims to produce high-quality images by using as few code streams as possible, which results in a rate-distortion tradeoff. In order to maintain a good balance between bit rate and distortion, practitioners focus on the following two aspects of research: 1. finding a most approximate entropy model for latent representations to optimize a length of a bit stream (low bit rate); and 2. obtaining more effective latent representations to reconstruct images precisely (less distortion).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Embodiments of this disclosure provide an image coding method and apparatus, a probability model generating method and apparatus, an image decoding method and apparatus and an image compression system, in which by using a pyramidal resize module and an inception encoder network, features of images may be accurately extracted to obtain more competitive latent representations.

According to a first aspect of the embodiments of this disclosure, there is provided an image coding apparatus, the apparatus including: a first feature extracting unit configured to perform feature extraction on an input image to obtain feature maps of N channels; a second feature extracting unit configured to perform feature extraction on the input image with its size being adjusted K times, to respectively obtain the feature maps of N channels; and a first concatenating unit configured to concatenate the feature maps of the N channels extracted by the first feature extracting unit with feature maps of K×N channels from the second feature extracting unit and then output them.

According to a second aspect of the embodiments of this disclosure, there is provided a probability model generating apparatus, the apparatus including: a multi-scale dilated convolution unit configured to perform feature extraction on output of a hyper decoder to obtain multi-scale auxiliary information; a context model processing unit configured to take a latent representation of an input image from a quantizer as input to obtain content-based prediction; and an entropy model processing unit configured to process output of the context model processing unit and output of the multi-scale dilated convolution unit to obtain a predicted probability model.

According to a third aspect of the embodiments of this disclosure, there is provided an image decoding apparatus, the image decoding apparatus including: a multi-scale dilated convolution unit configured to perform feature extraction on output of a hyper decoder to obtain multi-scale auxiliary information; a concatenator configured to concatenate a latent representation of an input image from an arithmetic decoder with the multi-scale auxiliary information from the multi-scale dilated convolution unit; and a decoder configured to decode output from the concatenator to obtain a reconstructed image of the input image.

According to a fourth aspect of the embodiments of this disclosure, there is provided an image coding method, the method including: performing feature extraction on an input image by using a plurality of inception units to obtain feature maps of N channels; performing feature extraction on the input image with its size being adjusted by using a plurality of convolutional layers, to respectively obtain the feature maps of N channels; and concatenating the feature maps of the N channels from the inception units with feature maps of N channels to which the plurality of convolutional layers correspond respectively and then outputting them.

According to a fifth aspect of the embodiments of this disclosure, there is provided a probability model generating method, the method including: performing feature extraction on output of a hyper decoder by using a multi-scale dilated convolution unit to obtain multi-scale auxiliary information; taking a latent representation of an input image from a quantizer as input by using a context model to obtain content-based prediction; and processing output of the context model and output of the multi-scale dilated convolution unit by using an entropy model to obtain a predicted probability model.

According to a sixth aspect of the embodiments of this disclosure, there is provided an image decoding method, the method including: performing feature extraction on output of a hyper decoder by using a multi-scale dilated convolution unit to obtain multi-scale auxiliary information; concatenating a latent representation of an input image from an arithmetic decoder with the multi-scale auxiliary information from the multi-scale dilated convolution unit by using a concatenator; and decoding output from the concatenator by using a decoder to obtain a reconstructed image of the input image.

According to another aspect of the embodiments of this disclosure, there is provided a computer readable program, which, when executed in an image processing device, will cause the image processing device to carry out the method as described in any one of the fourth, the fifth and the sixth aspects.

According to a further aspect of the embodiments of this disclosure, there is provided a storage medium storing computer readable program, the computer readable program will cause an image processing device to carry out the method as described in any one of the fourth, the fifth and the sixth aspects.

An advantage of the embodiments of this disclosure exists in that with the image coding method and apparatus, features of images may be accurately extracted and more competitive latent representations may be obtained; and with the image decoding method and apparatus, images may be reconstructed more accurately by fusion of multi-scale auxiliary information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various embodiments of this disclosure shall be described below with reference to the accompanying drawings, and these embodiments are illustrative only, and are not intended to limit this disclosure.

Embodiment 1

Figure 1:
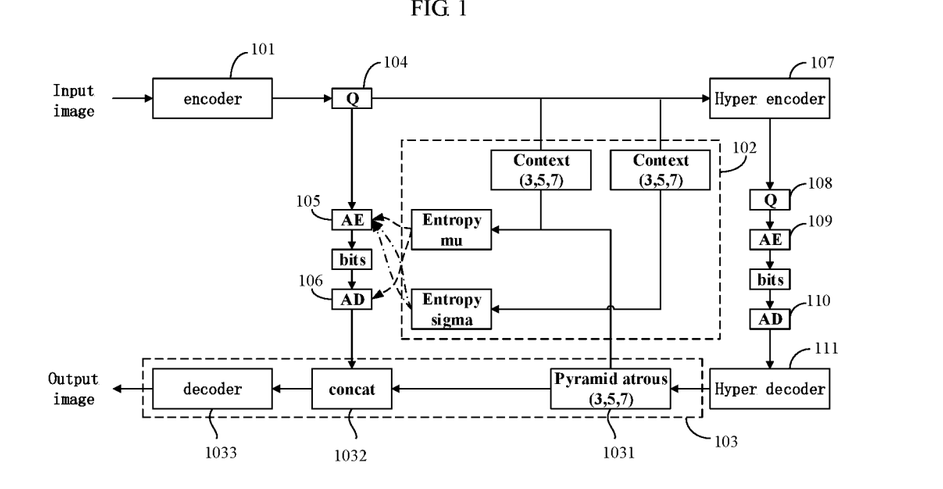
FIG. 1 is a schematic diagram of the image compression system of Embodiment 1.

The embodiment of this disclosure provides an image compression system. FIG. 1 is a schematic diagram of the image compression system of Embodiment 1. As shown in FIG. 1, the image compression system 100 of the embodiment of this disclosure includes: an image coding apparatus 101, a probability model generating apparatus 102 and an image decoding apparatus 103. The image coding apparatus 101 is used to perform downsampling on an input image to transform the input image into a latent representation. The probability model generating apparatus 102 is used to predict probability distribution of the latent representation to obtain a probability model of the latent representation. And the image decoding apparatus 103 is used to perform upsampling on the latent representation obtained by decoding according to the probability model to map the latent representation back to the input image.

In the embodiment of this disclosure, as shown in FIG. 1, the image coding apparatus 101 may also be referred to as an encoder 101, which is used to perform compression and coding on an input image, that is, to map the input image into a latent code space. A network structure of the encoder 101 and its implementations shall be described below.

In the embodiment of this disclosure, as shown in FIG. 1, the image compression system 100 may further include a quantizer (Q) 104, an arithmetic encoder (AE) 105 and an arithmetic decoder (AD) 106. The quantizer 104 is used to perform quantization on output from the encoder 101; hence, a latent representation from the encoder 101 is quantized, a discrete value vector is generated. The arithmetic encoder 105 is used to perform encoding on output from the quantizer 104 according to the probability model (i.e. the predicted probability distribution) generated by the above-described probability model generating apparatus 102, that is, compressing the above discrete value vector into a bit stream. And the arithmetic decoder 106 is an inverse of the arithmetic encoder 105, which is used to perform decoding on the received bit stream according to the probability model generated by the above-described probability model generating apparatus 102, that is, the arithmetic decoder 106 de-compresses the above-described bit stream into a quantized latent representation, and provides it to the image decoding apparatus 103.

In the embodiment of this disclosure, as shown in FIG. 1, the image compression system 100 may further include: a hyper encoder 107, a quantizer (Q) 108, an arithmetic encoder (AE) 109, an arithmetic decoder (AD) 110 and a hyper decoder 111. The hyper encoder 107 is used to further encode the output from the encoder 101. Processing of the quantizer 108, arithmetic encoder 109 and arithmetic decoder 110 is similar to that of the quantizer 104, arithmetic encoder 105 and arithmetic decoder 106, with the exception that the arithmetic encoder 109 and the arithmetic decoder 110 do not use the above probability model in performing compression and decompression, and their particular processing procedures shall not be described herein any further. The hyper decoder 111 is used to further decode the output from the arithmetic decoder 109. For network structures and implementations of the hyper encoder 107, quantizer (Q) 108, arithmetic encoder (AE) 109, arithmetic decoder (AD) 110 and hyper decoder 111, reference may be made to the related art, which shall not be described herein any further.

In the embodiment of this disclosure, as shown in FIG. 1, the image decoding apparatus 103 includes: a multi-scale dilated convolution unit (pyramid atrous) 1031, a concatenator 1032 and a decoder 1033. The multi-scale dilated convolution unit 1031 is used to generate multi-scale auxiliary information, the concatenator 1032 is used to concatenate the above multi-scale auxiliary information and the output from the arithmetic decoder 106, and the decoder 1033 is used to decode output from the concatenator 1032 so as to recover the input image, that is, discrete elements of the latent representation are retransformed back into a data space to obtain a reconstructed image. A network structure and implementation of the multi-scale dilated convolution unit 1031 shall be described below.

In the embodiment of this disclosure, as shown in FIG. 1, the probability model generating apparatus 102 includes a context model and an entropy model, wherein the context model obtains content-based prediction based on the output (latent representation) of the quantizer 104, and the entropy model is responsible for learning the probability model of the latent representation. In the embodiment of this disclosure, the entropy model generates the probability model based on the multi-scale auxiliary information from the multi-scale dilated convolution unit 1031 and the output from the context model. The multi-scale auxiliary information may correct the context-based prediction. In one embodiment, the entropy model generates an mu part (a mean parameter "mean") of the probability model based on an mu part of the context model and the above-described multi-scale auxiliary information, and generates a sigma part (a scale parameter "scale") of the probability model based on a sigma part of the context model and the above-described multi-scale auxiliary information. However, the embodiment of this disclosure is not limited thereto, and the entropy model may not distinguish between the mu part and the sigma part, and directly generate the mean parameter and scale parameter of the above probability model according to output of the context model and the multi-scale auxiliary information.

The division of the image coding apparatus 101, the image decoding apparatus 103 and the probability model generating apparatus 102 in FIG. 1 is an example only, and the embodiments of this disclosure are not limited thereto. For example, the hyper encoder 107 and the hyper decoder 111 may also be taken as a part of the probability model generating apparatus 102, or may be taken as a part of the image decoding apparatus 103; and for another example, the multi-scale dilated convolution unit 1032 may be taken as a part of the image decoding apparatus 103, or may be taken as a part of the probability model generating apparatus 102.

In the embodiment of this disclosure, distortion between an original image and the reconstructed image is directly related to quality of the extracted features, the more features extracted, the smaller the distortion, to some extent. In order to obtain a latent representation containing features as possible, the above-described encoder 101 is used in the embodiment of this disclosure to construct a multi-scale network to effectively extract features of the input image.

Figure 2:
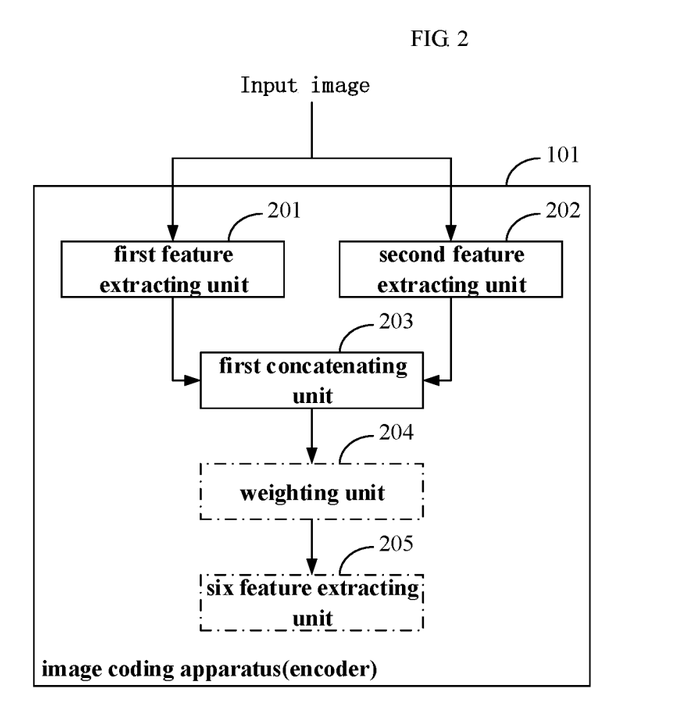
FIG. 2 is a schematic diagram of the image coding apparatus of Embodiment 2.

FIG. 2 is a schematic diagram of the image coding apparatus 101 of the embodiment of this disclosure. As shown in FIG. 2, the image coding apparatus 101 of the embodiment of this disclosure includes: a first feature extracting unit 201, a second feature extracting unit 202 and a first concatenating unit 203, the first feature extracting unit 201, the second feature extracting unit 202 and the first concatenating unit 203 constituting the encoder 101 shown in FIG. 1. In the embodiment of this disclosure, the first feature extracting unit 201 is configured to perform feature extraction on an input image to obtain feature maps of N channels; the second feature extracting unit 202 is configured to perform feature extraction on the input image with its size being adjusted K times, to respectively obtain the feature maps of N channels; and the first concatenating unit 203 is configured to concatenate the feature maps of the N channels from the first feature extracting unit 201 and feature maps of K×N channels from the second feature extracting unit 202 and then output them.

Generally, when a convolutional neural network is used to extract feature maps from an image, global and high-level information is displayed in deeper layers, and local and fine information, such as edges, are presented in shallower layers. Therefore, the embodiment of this disclosure obtains global and high-level information from an original input image by using the above first feature extracting unit 201, and obtains features of details from the input image with its size being adjusted by using the above second feature extracting unit 202. The first feature extracting unit 201 may be a multi-layer network, such as a four-layer network, and the second feature extracting unit 202 may be a convolutional layer network, which shall be described below, respectively.

In the embodiment of this disclosure, the first feature extracting unit 201 may include a plurality of inception units, the plurality of inception units being sequentially connected, which perform feature extraction on the input image or a feature map from a preceding inception unit to obtain global information and high-level information of the input image. As to principles of operation of the inception units, reference may be made to the related art, such as Christian Szegedy, Wei Liu, Yangqing Jia, Pierre Sermanet, Scott Reed, Dragomir Anguelov, Dumitru Erhan, Vincent Vanhoucke, and Andrew Rabinovich, *Going deeper with convolutions*, in Proceedings of the IEEE conference on computer vision and pattern recognition, pages 1-9, 2015, which shall not be described herein any further.

Figure 3:
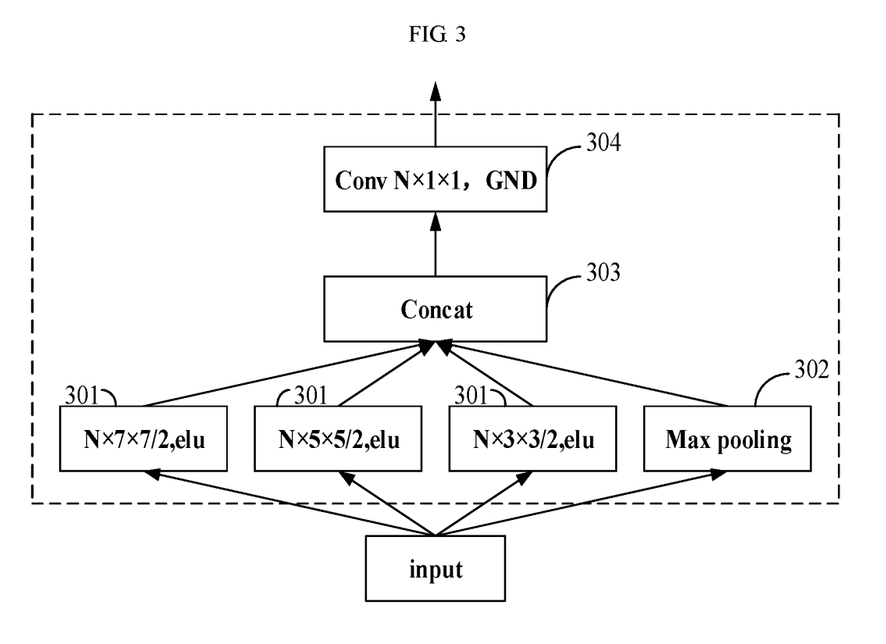
FIG. 3 is a schematic diagram of a network structure of an embodiment of an inception unit of the first feature extracting unit of the image coding apparatus shown in FIG. 2.

FIG. 3 is a schematic diagram of a network structure of an embodiment of the inception unit of the embodiment of this disclosure. As shown in FIG. 3, in this embodiment, the inception unit includes three convolutional layers (referred to as third feature extracting units) 301, a pooling layer (referred to as a pooling unit) 302, a concatenation layer (referred to as a second concatenating unit) 303 and a convolutional layer (referred to as a fourth feature extracting unit) 304. The three convolutional layers 301 perform feature extraction on the input image or the feature map from the preceding inception unit by using different convolution kernels (3×3, 5×5, 7×7) and identical numbers (N) of channels, to respectively obtain feature maps of N channels; the pooling layer 302 performs down-dimension processing on the input image or the feature map from the preceding inception unit to obtain the feature maps of the N channels; the concatenation layer 303 concatenates the feature maps of the N channels from the three convolutional layers 301 and the feature maps of the N channels from the pooling layer 302 to obtain feature maps of 4N channels; and the convolutional layer 304 performs down-dimension processing on the feature maps from the concatenation layer 303 to obtain the feature maps of the N channels. In the embodiment of this disclosure, using a maximum pooling method by the pooling layer 302 is taken as an example; however, the embodiment of this disclosure is not limited thereto. And reference may be made to the related art for principles of operation of the pooling layer, which shall not be described herein any further.

The inception unit of the embodiment of this disclosure may significantly help reconstruct the image by using the multi-scale features. Furthermore, the inception unit of the embodiment of this disclosure uses the multi-scale features by using different kernels, so that more features may be obtained from the original input image. Moreover, the embodiment of this disclosure uses the same numbers of channels for the convolutional layers 301 of different kernels, and concatenates results thereof. A convolutional layer 304 with a kernel of 1×1 is used to decide which one is more important, thereby obtaining output of a current layer.

The network structure of the inception unit shown in FIG. 3 is an example only, and the embodiment of this disclosure is not limited thereto.

In the embodiment of this disclosure, the second feature extracting unit 202 may include a size adjusting unit and a feature extracting unit (referred to as a fifth feature extracting unit). The size adjusting unit adjusts a size of the input image, and the fifth feature extracting unit performs feature extraction on the input image with the size being adjusted to obtain the feature maps of the N channels.

In the embodiment of this disclosure, the size adjusting unit and the fifth feature extracting unit may be of one or more groups, that is, one size adjusting unit and one fifth feature extracting unit may be taken as a group of feature extracting modules, and the second feature extracting unit 202 may include one or more groups of feature extracting modules, the size adjusting units of different groups performing size adjustment on the input image by using different scales, and the fifth feature extracting units of different groups performing feature extraction on the input image with the size being adjusted by using different convolution kernels (kernels). The second feature extracting unit 202 constitutes a convolutional layer network.

Figure 4:
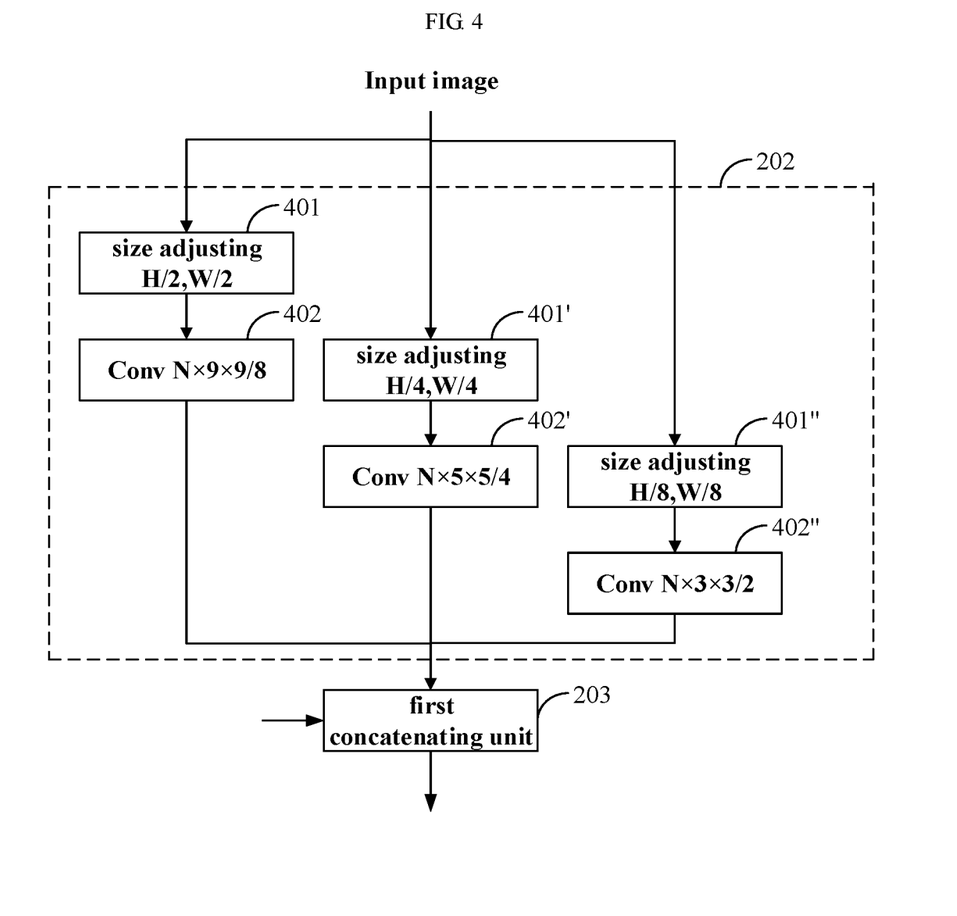
FIG. 4 is a schematic diagram of a network structure of an embodiment of a second feature extracting unit of the image coding apparatus shown in FIG. 2.

FIG. 4 is a schematic diagram of a network structure of an embodiment of the second feature extracting unit 202. As shown in FIG. 4, the second feature extracting unit 202 includes three size adjusting units 401 and three convolutional layers 402, that is, including three groups of feature extracting modules; wherein the three size adjusting units 401, 401', 401" respectively adjust the size of the input image by ½, ¼, and ⅛, thereby adjusting the input image for three times, that is, K=3; where, H is a height of the input image, and W is a width of the input image; the three convolutional layers 402, 402', and 402", taken as the fifth feature extracting unit, perform feature extraction on the input image with the size being adjusted by using different kernels (9×9, 5×5, 3×3) to obtain feature maps of N channels and output them to the first concatenating unit 203. In the embodiment of this disclosure, as the scales for adjusting the size of the input image by the three size adjusting units 401, 401', 401" are different, dimensions lowered by the three convolutional layers 402, 402', 402" are also different. For example, for ½ of the input image, the convolutional layer 402 performs 8-dimensional reduction processing, for ¼ of the input image, the convolutional layer 402' performs 4-dimensional reduction processing, and for ⅛ of the input image, the convolutional layer 402" performs 2-dimensional reduction processing, thereby ensuring that the feature maps inputted into the first concatenating unit 203 by the second feature extracting unit 202 have dimensions identical to dimensions of the feature maps inputted into the first concatenating unit 203 by the first feature extracting unit 201.

In the embodiment of this disclosure, as shown in FIG. 2, the image coding apparatus 101 may further include a weighting unit 204 and a sixth feature extracting unit 205. The weighting unit 204 is configured to assign weights to feature maps of channels from the first concatenating unit 203, and the sixth feature extracting unit 205 is configured to perform down-dimension processing on feature maps from the weighting unit 204 to obtain feature maps of M channels and output the feature maps of M channels. In the embodiment of this disclosure, the weighting unit 204 is used to assign weights to the feature maps of the channels, thereby reserving useful features and suppressing less useful features, and the sixth feature extracting unit is used to perform down-dimension processing on the inputted feature maps, thereby reducing an amount of computation.

In the embodiment of this disclosure, a network structure of the weighting unit 204 is not limited, and a structure of a weighted layer in the related art may function as the weighting unit 204 of the embodiment of this disclosure. In the embodiment of this disclosure, the sixth feature extracting unit 205 may be implemented by a convolutional layer with a kernel of 1×1, and the embodiment of this disclosure is not limited thereto.

Figure 5:
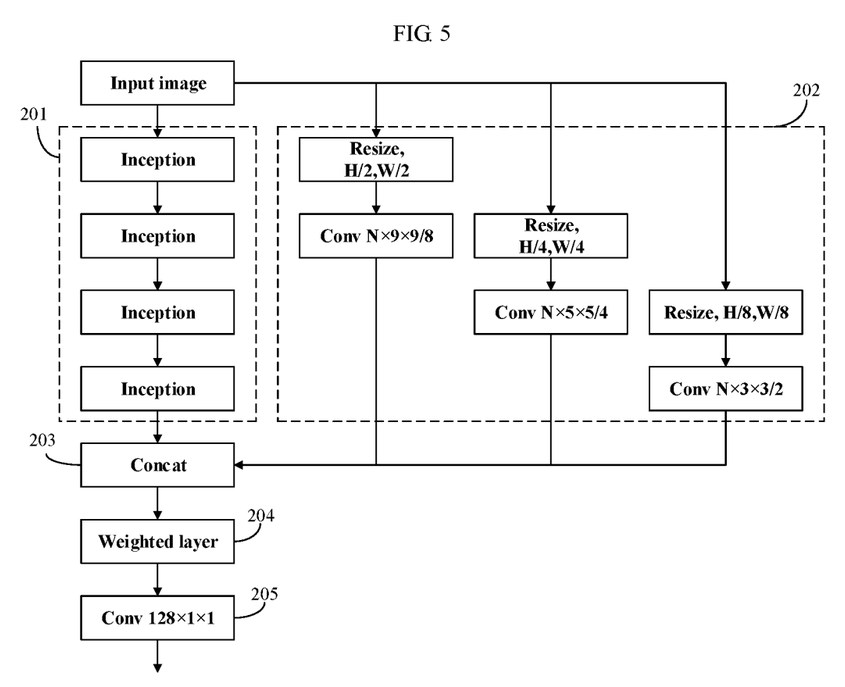
FIG. 5 is a schematic diagram of a network structure of an embodiment of the image coding apparatus shown in FIG. 2.

FIG. 5 is a schematic diagram of a network structure of an embodiment of the image coding apparatus 101 of the embodiment of this disclosure. As shown in FIG. 5, the first feature extracting unit 201 of the image coding apparatus 101 is implemented by four inception units, which constitute a four-layer network architecture and extract global information and high-level information from the original input image; the second feature extracting unit 202 of the image coding apparatus 101 has three groups of feature extracting modules, which respectively perform size adjustment and feature extraction on the original input image, a particular network structure of which having been described in FIG. 4, which shall not be described herein any further; the first concatenating unit 203 of the image coding apparatus 101 is implemented by a concat function; the weighting unit 204 of the image coding apparatus 101 is implemented by a weighted layer; and the sixth feature extracting unit 205 of the image coding apparatus 101 is implemented by a 1×1 convolutional layer; in this example, N=192, and M=128.

Figure 6:
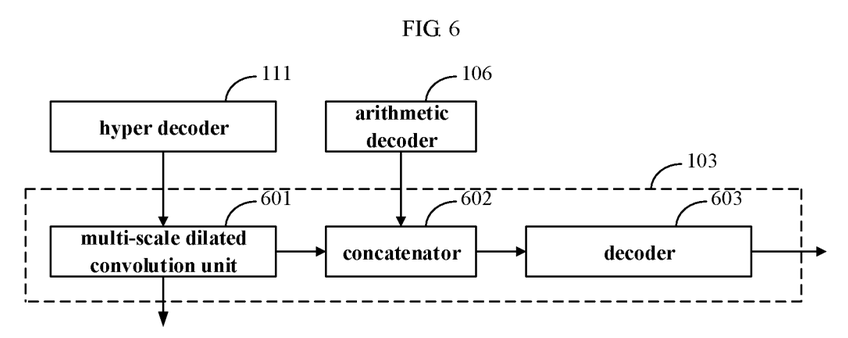
FIG. 6 is a schematic diagram of the image decoding apparatus of Embodiment 3.

FIG. 6 is a schematic diagram of the image decoding apparatus 103 of the embodiment of this disclosure. As shown in FIG. 6, the image decoding apparatus 103 of the embodiment of this disclosure includes a multi-scale dilated convolution unit 601, a concatenator 602 and a decoder 603. The multi-scale dilated convolution unit 601 is configured to perform feature extraction on output of a hyper decoder 111 to obtain multi-scale auxiliary information; the concatenator 602 is configured to concatenate a latent representation of an input image from the arithmetic decoder 106 and the multi-scale auxiliary information from the multi-scale dilated convolution unit 601; and the decoder 603 is configured to decode output from the concatenator 602 to obtain a reconstructed image of the input image. Network structures and implementations of the hyper decoder 111 and the arithmetic decoder 106 are identical to those of the hyper decoder 111 and the arithmetic decoder 106 shown in FIG. 1, and reference may be made to the related art, which shall not be described herein any further.

In the embodiment of this disclosure, the multi-scale dilated convolution unit 602 may include a plurality of feature extracting units. The feature extracting units may be implemented by dilated convolution layers, such as three dilated convolution layers. The three dilated convolution layers may perform feature extraction on the output of the hyper decoder by using different dilation ratios (i.e. dilated convolution kernels of different dilation ratios) and identical numbers of channels to obtain the multi-scale auxiliary information.

Figure 7:
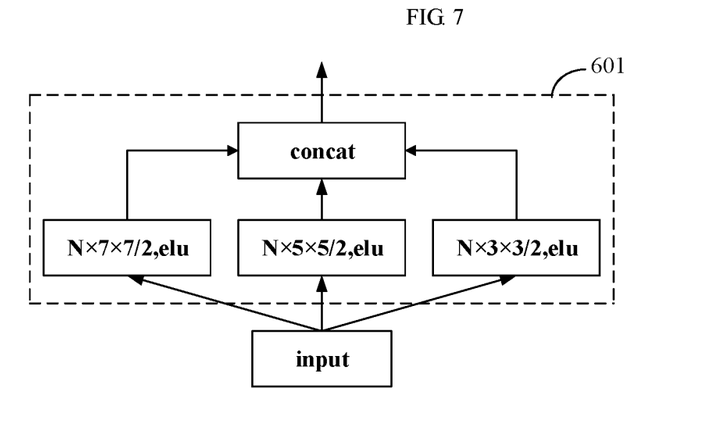
FIG. 7 is a schematic diagram of a network structure of an embodiment of a multi-scale dilated convolution unit.

FIG. 7 is a schematic diagram of a network structure of an embodiment of the multi-scale dilated convolution unit 601. As shown in FIG. 7, the multi-scale dilated convolution unit 601 is implemented by three 3×3 dilated convolution layers with different dilated ratios, the dilated ratios being 1, 2 and 3, respectively, and the numbers of channels of the three convolutional layers being all N, thereby obtaining the multi-scale auxiliary information. For the implementation of the dilated convolutional layers, reference may be made to the related art, which shall not be described herein any further.

In the embodiment of this disclosure, by adding the multi-scale dilated convolution unit 601 after the hyper decoder 111, the multi-scale auxiliary information may be obtained from the hyper network (the hyper encoder and the hyper decoder), and by concatenating the information with the quantized latent representation (the output of the arithmetic decoder 106) via the concatenator 602, more features may be obtained and may be fed back to the decoder network (the decoder 603).

Figure 8:
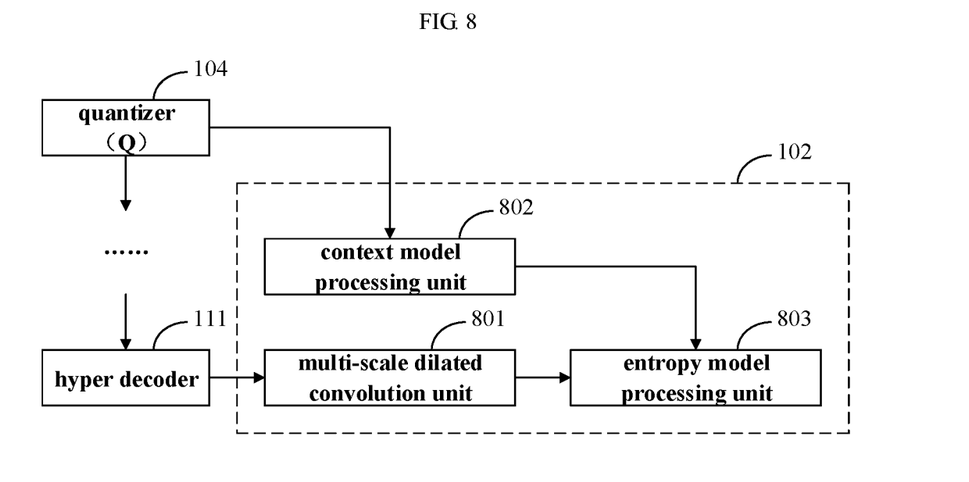
FIG. 8 is a schematic diagram of the probability model generating apparatus of Embodiment 4.

FIG. 8 is a schematic diagram of the probability model generating apparatus 102 of the embodiment of this disclosure. As shown in FIG. 8, the probability model generating apparatus 102 of the embodiment of this disclosure includes a multi-scale dilated convolution unit 801, a context model processing unit 802 and an entropy model processing unit 803. The multi-scale dilated convolution unit 801 is configured to perform feature extraction on the output of the hyper decoder 111 to obtain the multi-scale auxiliary information; the context model processing unit 802 is configured to obtain content-based prediction by taking a latent representation of an input image from the quantizer 104 as input; and the entropy model processing unit 803 is configured to process output of the context model processing unit 802 and output of the multi-scale dilated convolution unit 801 to obtain a predicted probability model, and provide the predicted probability model to the arithmetic encoder 105 and the arithmetic decoder 106. For network structures and implementations of the arithmetic encoder 105 and the arithmetic decoder 106, reference may be made to the related art, which shall not be described herein any further.

In the embodiment of this disclosure, a network structure of the multi-scale dilated convolution unit 801 is not limited. FIG. 7 shows an example, and the embodiment of this disclosure is not limited thereto.

With the image compression system of the embodiment of this disclosure, the features of the image may be accurately extracted, and more competitive latent representation may be obtained.

Embodiment 2

The embodiment of this disclosure provides an image coding apparatus. FIG. 2 is a schematic diagram of the image coding apparatus of the embodiment of this disclosure, FIG. 3 is a schematic diagram of a network structure of an embodiment of an inception unit of the first feature extracting unit 201 of the image coding apparatus of the embodiment of this disclosure, FIG. 4 is a schematic diagram of a network structure of an embodiment of the second feature extracting unit 202 of the image coding apparatus of the embodiment of this disclosure, and FIG. 5 is a schematic diagram of a network structure of an embodiment of the image coding apparatus of the embodiment of this disclosure. As the image coding apparatus has been described in detail in Embodiment 1, the contents of which are incorporated herein, which shall not be described herein any further.

With the image coding apparatus of the embodiment of this disclosure, the features of the image may be accurately extracted, and more competitive latent representation may be obtained.

Embodiment 3

The embodiment of this disclosure provides an image decoding apparatus. FIG. 6 is a schematic diagram of the image decoding apparatus 103 of the embodiment of this disclosure, and FIG. 7 is a schematic diagram of a network structure of an embodiment of a multi-scale dilated convolution unit 601 of the image decoding apparatus 103. As the image decoding apparatus has been described in detail in Embodiment 1, the contents of which are incorporated herein, which shall not be described herein any further.

With the image decoding apparatus of the embodiment of this disclosure, more auxiliary information may be obtained to achieve more accurately constructing an image.

Embodiment 4

The embodiment of this disclosure provides a probability model generating apparatus. FIG. 8 is a schematic diagram of the probability model generating apparatus of the embodiment of this disclosure, and FIG. 7 is a schematic diagram of a network structure of an embodiment of a multi-scale dilated convolution unit 801 of the probability model generating apparatus. As the probability model generating apparatus has been described in detail in Embodiment 1, the contents of which are incorporated herein, which shall not be described herein any further.

With the probability model generating apparatus of the embodiment of this disclosure, probability distribution of a latent representation may be better predicted after the multi-scale auxiliary information is added.

Embodiment 5

The embodiment of this disclosure provides an image coding method. As principles of the method for solving problems are similar to that of the apparatus in Embodiment 2, which is described in Embodiment 1, reference may be made to the implementations of the apparatus in Embodiments 1 and 2 for implementation of the method, with identical contents being not going to be described herein any further.

Figure 9:
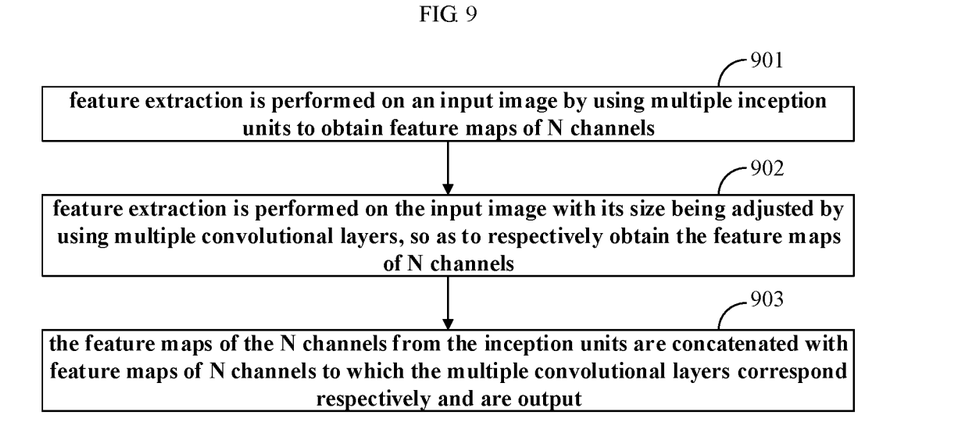
FIG. 9 is a schematic diagram of the image coding method of Embodiment 5.

FIG. 9 is a schematic diagram of the image coding method of the embodiment of this disclosure. As shown in FIG. 9, the image coding method includes:

901: feature extraction is performed on an input image by using a plurality of inception units to obtain feature maps of N channels;

902: feature extraction is performed on the input image with its size being adjusted by using a plurality of convolutional layers, to respectively obtain the feature maps of N channels; and 903: the feature maps of the N channels from the inception units are concatenated with feature maps of N channels to which the plurality of convolutional layers correspond respectively and are output.

In the embodiment of this disclosure, reference may be made to the implementations of the units in FIG. 2 for implementations of the operations in FIG. 9, which shall not be described herein any further.

In operation 901 of the embodiment of this disclosure, the plurality of inception units may be sequentially connected, and feature extraction may be performed on the input image or feature maps from a preceding inception unit to obtain global information and high-level information of the input image.

In an embodiment, each of the inception units includes three convolutional layers and a pooling layer. The three convolutional layers perform feature extraction on the input image or the feature maps from the preceding inception unit by using different convolution kernels and identical numbers of channels, to respectively obtain feature maps of N channels; and the pooling layer performs down-dimension processing on the input image or the feature maps from the preceding inception unit to obtain the feature maps of the N channels;

In some embodiments, each of the inception units may also include a concatenation layer and a convolutional layer. The concatenation layer concatenates the feature maps of the N channels from the three convolutional layers with the feature maps of the N channels from the pooling layer to obtain feature maps of 4N channels; and the convolutional layer performs down-dimension processing on the feature maps from the concatenation layer to obtain the feature maps of the N channels.

In operation 902 of the embodiment of this disclosure, a size of the input image may be adjusted by different scales first, and then feature extraction is performed on the input image with its size being adjusted; wherein each convolutional layer corresponds to an input image with its size being adjusted, thereby respectively obtaining the feature maps of the N channels.

In some embodiments, the plurality of convolutional layers may use different convolution kernels and identical numbers of channels, and for the input image with its sized being adjusted, the dimensions reduced by the convolutional layers are ensured to be the same, so as to facilitate concatenation.

In operation 903 of the embodiment of this disclosure, a concatenation layer or a concat function (concat) may be used to concatenate the feature maps extracted by the above feature extracting units.

In the embodiment of this disclosure, weights may be assigned to feature maps of the concatenated channels, and down-dimension processing may be performed on the feature maps assigned with the weights to obtain feature maps of M channels and output the feature maps of M channels, thereby reducing the number of pixels to be processed and saving amount of computation.

With the image coding method of the embodiment of this disclosure, the features of the image may be accurately extracted, and more competitive latent representation may be obtained.

Embodiment 6

The embodiment of this disclosure provides an image decoding method. As principles of the method for solving problems are similar to that of the apparatus in Embodiment 3, which is described in Embodiment 1, reference may be made to the implementations of the apparatus in Embodiments 1 and 3 for implementation of the method, with identical contents being not going to be described herein any further.

Figure 10:
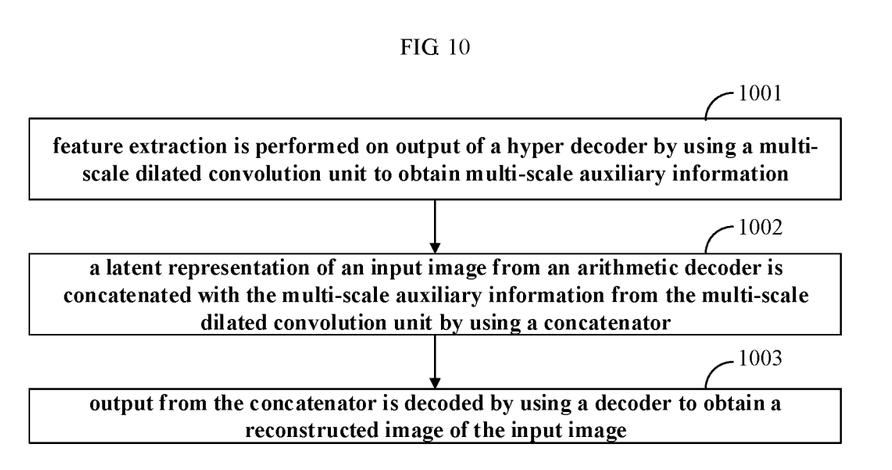
FIG. 10 is a schematic diagram of the image decoding method of Embodiment 6.

FIG. 10 is a schematic diagram of the image decoding method of the embodiment of this disclosure. As shown in FIG. 10, the image decoding method includes:

1001: feature extraction is performed on output of a hyper decoder by using a multi-scale dilated convolution unit to obtain multi-scale auxiliary information;

1002: a latent representation of an input image from an arithmetic decoder is concatenated with the multi-scale auxiliary information from the multi-scale dilated convolution unit by using a concatenator; and 1003: output from the concatenator is decoded by using a decoder to obtain a reconstructed image of the input image.

In the embodiment of this disclosure, the above multi-scale dilated convolution unit may include three dilated convolution layers. The three dilated convolution layers may perform feature extraction on the output of the hyper decoder by using different dilation ratios and identical numbers of channels to obtain the multi-scale auxiliary information.

In the embodiment of this disclosure, the above concatenator may be a concatenation layer in a convolutional neural network, and its implementation shall not be described herein any further.

With the image decoding method of the embodiment of this disclosure, more auxiliary information may be obtained to achieve more accurately constructing an image.

Embodiment 7

The embodiment of this disclosure provides a probability model generating method. As principles of the method for solving problems are similar to that of the apparatus in Embodiment 4, which is described in Embodiment 1, reference may be made to the implementations of the apparatus in Embodiments 1 and 4 for implementation of the method, with identical contents being not going to be described herein any further.

Figure 11:
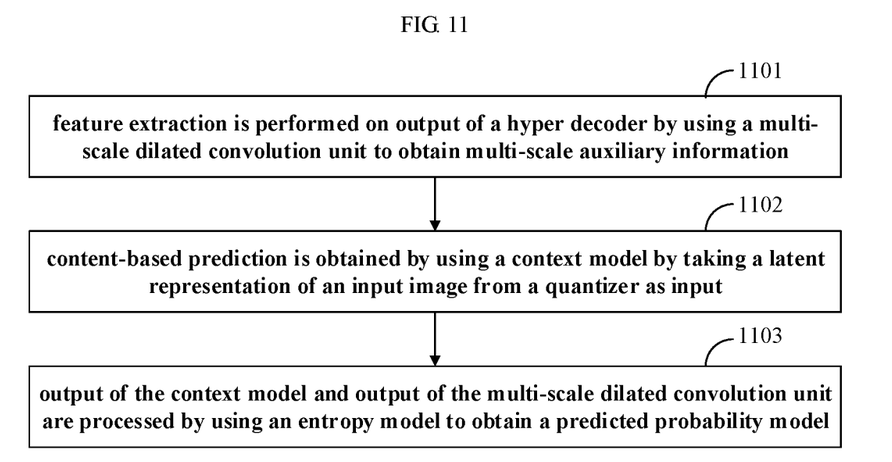
FIG. 11 is a schematic diagram of the probability model generation method of Embodiment 7.

FIG. 11 is a schematic diagram of the probability model generating method of the embodiment of this disclosure. As shown in FIG. 11, the probability model generating method includes:

1101: feature extraction is performed on output of a hyper decoder by using a multi-scale dilated convolution unit to obtain multi-scale auxiliary information;

1102: content-based prediction is obtained by using a context model by taking a latent representation of an input image from a quantizer as input; and

1103: output of the context model and output of the multi-scale dilated convolution unit are processed by using an entropy model to obtain a predicted probability model.

In the embodiment of this disclosure, the above multi-scale dilated convolution unit may include three dilated convolution layers. The three dilated convolution layers may perform feature extraction on the output of the hyper decoder by using different dilation ratios and identical numbers of channels to obtain the multi-scale auxiliary information.

In the embodiment of this disclosure, the above context model and entropy model may by a context model and entropy model in an image compression system adopting a convolutional neural network, and the implementations of which shall not be described herein any further.

With the probability model generating method of the embodiment of this disclosure, probability distribution of a latent representation may be better predicted after the multi-scale auxiliary information is added.

Embodiment 8

The embodiment of this disclosure provides an image processing device, including the image coding apparatus described in Embodiments 1 and 2 or the image decoding apparatus described in Embodiments 1 and 3, or including the probability model generation apparatus described in Embodiments 1 and 4, or including the above image coding apparatus, image decoding apparatus and probability model generating apparatus at the same time. When both the image decoding apparatus and the probability model generating apparatus are included, the aforementioned multi-scale dilated convolution unit may be commonly used.

As the image coding apparatus, the probability model generating apparatus and the image decoding apparatus have been described in detail in Embodiment 1-4, the contents of which are incorporated herein, which shall not be described herein any further.

Figure 12:
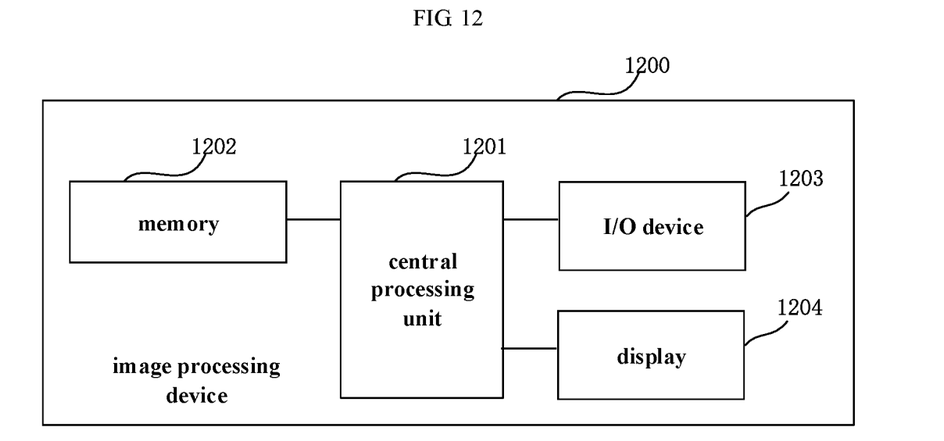
FIG. 12 is a schematic diagram of the image processing device of Embodiment 8.

FIG. 12 is a schematic diagram of the image processing device of the embodiment of this disclosure. As shown in FIG. 12, an image processing device 1200 may include a central processing unit (CPU) 1201 and a memory 1202, the memory 1202 being coupled to the central processing unit 1201. The memory 1202 may store various data, and furthermore, it may store a program for information processing, and execute the program under control of the central processing unit 1201.

In one embodiment, functions of the image coding apparatus and/or the probability model generating apparatus and/or the image decoding apparatus may be integrated into the central processing unit 1201. The central processing unit 1201 may be configured to carry out the method(s) as described in Embodiment(s) 5 and/or 6 and/or 7.

In another embodiment, the image coding apparatus and/or the probability model generating apparatus and/or the image decoding apparatus and the central processing unit 1201 may be configured separately; for example, the image coding apparatus and/or the probability model generating apparatus and/or the image decoding apparatus may be configured as a chip connected to the central processing unit 1201, and the functions of the image coding apparatus and/or the probability model generating apparatus and/or the image decoding apparatus are executed under the control of the central processing unit 1201.

Furthermore, as shown in FIG. 12, the image processing device may include an input/output (I/O) device 1203, and a display 1204, etc.; wherein functions of the above components are similar to those in the related art, and shall not be described herein any further. It should be noted that the image processing device does not necessarily include all the components shown in FIG. 12; and furthermore, the image processing device may also include components not shown in FIG. 12, and reference may be made to the related art.

An embodiment of this disclosure provides a computer readable program, which, when executed in an image processing device, will cause the image processing device to carry out the method(s) as described in Embodiment(s) 5 and/or 6 and/or 7.

An embodiment of this disclosure provides a storage medium storing a computer readable program, the computer readable program will cause an image processing device to carry out the method(s) as described in Embodiment(s) 5 and/or 6 and/or 7.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The processing methods carried out in the apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 2, 6 and 8 may either correspond to software modules of procedures of a computer program, or correspond to hardware modules. Such software modules may respectively correspond to the steps shown in FIGS. 9, 10 and 11. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus, comprising:
a processor to couple to a memory and to,
perform feature extraction on an input image to obtain first feature maps of N channels;
perform feature extraction on the input image with a size of the input image being adjusted K times, to respectively obtain second feature maps of K×N channels;
concatenate the first feature maps of the N channels with the second feature maps of K×N channels to output concatenated feature maps of channels;
assign weights to the concatenated feature maps of channels; and
perform down-dimension processing on the weighted concatenated feature maps of channels to obtain feature maps of M channels and output the feature maps of M channels.

2. The apparatus according to claim 1, wherein to obtain the first feature maps the processor is to configure a plurality of inception processors, each inception processor being sequentially connected, which perform the feature extraction on the input image or perform feature extraction on feature maps from a preceding inception processor to obtain global information and high-level information of the input image.

3. The apparatus according to claim 2, wherein each inception processor of the inception processors is to:
perform the feature extraction on the input image or perform feature extraction on the feature maps from the preceding inception processor by using different convolution kernels and identical numbers of channels, to respectively obtain the first feature maps of N channels;
perform a pooling by down-dimension processing on the input image or on the feature map from the preceding inception processor to obtain the first feature maps of the N channels;
concatenate the first feature maps of the N channels with the first feature maps of the N channels from the pooling to obtain feature maps of 4N channels; and
perform down-dimension processing on the feature maps of the 4N channels to obtain the first feature maps of the N channels.

4. The apparatus according to claim 1, wherein to obtain the second features maps of K×N channels, the processor is to:
adjust the size of the input image; and
perform feature extraction on the input image with the size being adjusted to obtain the second feature maps of the K×N channels.

5. The apparatus according to claim 4, to adjust the size of the input image, the processor is to configure one or more groups of size adjusting processors, size adjusting processors of different groups performing size adjustment on the input image by using different scales, and performing feature extraction on the input image with the size being adjusted by using different convolution kernels.

6. An apparatus, comprising:
a processor to couple to a memory and to,
perform feature extraction on output of a hyper decoder to obtain multi-scale auxiliary information;
concatenate a latent representation of an input image from an arithmetic decoder with the multi-scale auxiliary information; and
decode output from the concatenator to obtain a reconstructed image of the input image.

7. The apparatus according to claim 6, wherein to perform the feature extraction, the processor is to use dilated convolution kernels of different dilation ratios and identical numbers of channels to obtain the multi-scale auxiliary information.

8. An apparatus, comprising:
a processor to couple to a memory and to,
perform feature extraction on output of a hyper decoder to obtain multi-scale auxiliary information;
obtain information indicating content-based prediction by taking a latent representation of an input image from a quantizer as input; and
process the information indicating the content-based prediction and the multi-scale auxiliary information to obtain a predicted probability model,
wherein to perform the feature extraction, the processor is to use dilated convolution kernels of different dilation ratios and identical numbers of channels to obtain the multi-scale auxiliary information.

* * * * *